United States Patent
Ganapathi et al.

(10) Patent No.: US 12,003,467 B2
(45) Date of Patent: Jun. 4, 2024

(54) SHARING WEB ENTITIES BASED ON TRUST RELATIONSHIPS

(71) Applicant: Microsoft Technology Licensing, LLC, Redmond, WA (US)

(72) Inventors: Swathi Ganapathi, Seattle, WA (US); George Karalis, Redmond, WA (US); Michael J. Patten, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/605,937

(22) Filed: May 25, 2017

(65) Prior Publication Data
US 2018/0343215 A1 Nov. 29, 2018

(51) Int. Cl.
| | |
|---|---|
| H04L 67/141 | (2022.01) |
| G06F 16/954 | (2019.01) |
| G06F 21/62 | (2013.01) |
| H04L 51/046 | (2022.01) |
| H04L 51/214 | (2022.01) |
| H04L 67/02 | (2022.01) |
| H04L 67/50 | (2022.01) |
| H04L 69/329 | (2022.01) |
| H04L 67/14 | (2022.01) |

(52) U.S. Cl.
CPC .......... *H04L 51/046* (2013.01); *G06F 16/954* (2019.01); *G06F 21/6218* (2013.01); *H04L 51/214* (2022.05); *H04L 67/02* (2013.01); *H04L 67/535* (2022.05); *H04L 69/329* (2013.01); *G06F 2216/15* (2013.01); *H04L 67/14* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 7,660,899 B2 | 2/2010 | Gavrilescu et al. | |
| 8,387,122 B2* | 2/2013 | Toomim | G06F 21/6218 726/5 |
| 9,152,970 B1 | 10/2015 | Trahan et al. | |
| 9,305,094 B2 | 4/2016 | Bastide et al. | |
| 9,413,840 B2* | 8/2016 | Taylor | H04L 67/02 |

(Continued)

OTHER PUBLICATIONS

"Co-browsing Software", https://www.tagove.com/co-browsing-software/, Retrieved on: Feb. 28, 2017, 5 pages.

(Continued)

*Primary Examiner* — James A Edwards
(74) *Attorney, Agent, or Firm* — Barta Jones, PLLC

(57) ABSTRACT

During web browsing, a plurality of web entities associated with browsing activity of a first browsing identity of a first user are received. One or more of the plurality of web entities are selected for sharing. Further, one or more subscriber browsing identities associated with the first browsing identity are selected based on one or more associated trust relationships, and the selected web entities are sent to the selected subscriber browsing identities. The disclosure enhances social interaction and collaborative aspects of web browsing with respect to web browsing activity, enabling users to share browsing activity easily.

20 Claims, 8 Drawing Sheets

(56) References Cited

U.S. PATENT DOCUMENTS

| | | | |
|---|---|---|---|
| 9,483,448 B2* | 11/2016 | Pirnazar | H04L 67/02 |
| 9,959,523 B2* | 5/2018 | Lewis | H04N 7/147 |
| 2008/0040387 A1* | 2/2008 | Schwartz | G06F 16/9535 |
| 2010/0250755 A1* | 9/2010 | Morris | H04L 67/24 |
| | | | 709/228 |
| 2012/0054280 A1* | 3/2012 | Shah | G06F 9/5072 |
| | | | 709/205 |
| 2012/0185784 A1 | 7/2012 | Katz | |
| 2012/0209907 A1* | 8/2012 | Andrews | G06F 16/9535 |
| | | | 709/204 |
| 2013/0080534 A1* | 3/2013 | Ogawa | G06Q 10/10 |
| | | | 709/204 |
| 2013/0110978 A1* | 5/2013 | Gordon | H04N 21/4627 |
| | | | 709/218 |
| 2013/0218871 A1* | 8/2013 | McConnell | G06F 16/248 |
| | | | 707/722 |
| 2014/0201288 A1 | 7/2014 | Roy et al. | |
| 2015/0039584 A1* | 2/2015 | Bastide | H04L 51/32 |
| | | | 707/709 |
| 2015/0149557 A1 | 5/2015 | Mendez et al. | |
| 2015/0244814 A1 | 8/2015 | Khalatian et al. | |
| 2016/0182721 A1 | 6/2016 | Khalatian et al. | |
| 2016/0210602 A1* | 7/2016 | Siddique | G06Q 20/0453 |
| 2017/0013073 A1 | 1/2017 | Mendez et al. | |
| 2019/0020853 A1* | 1/2019 | Segal | H04N 7/15 |

OTHER PUBLICATIONS

"Live Co-Browsing", http://zchat.com/features/co-browsing.aspx, Published on: Jul. 25, 2016, 4 pages.

* cited by examiner

SHARING WEB ENTITIES BASED ON TRUST RELATIONSHIPS

BACKGROUND

Web browsing has become a ubiquitous activity that is used for many purposes. In addition to simply viewing web pages, people browse the web to do research, work on projects, view videos, listen to music, place online orders, play games, talk to other people through instant messaging or video chat, etc. The modern web browser is one of the most commonly used applications on personal computers, laptops, tablets, and the like.

While web browsing has become an extremely useful means for finding, saving, and/or managing online information, media, and the like, available methods for communicating the results of web browsing with others remains limited. In many cases, sharing web browsing data is limited to simply sharing hyperlinks of viewed web pages.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method comprises receiving a plurality of web entities associated with browsing activity of a first browsing identity of a user in a web browser. One or more of the plurality of web entities are selected for sharing. One or more subscriber browsing identities associated with the first browsing identity are selected based on one or more associated trust relationships, and the one or more selected web entities are shared with the one or more selected subscriber browsing identities.

Many of the attendant features will be more readily appreciated as the same becomes better understood by reference to the following detailed description considered in connection with the accompanying drawings.

BRIEF DESCRIPTION OF THE DRAWINGS

Corresponding reference characters indicate corresponding parts throughout the drawings. In FIGS. 1 to 6, the systems are illustrated as schematic drawings. The drawings may not be to scale.

DETAILED DESCRIPTION

Figure 1:
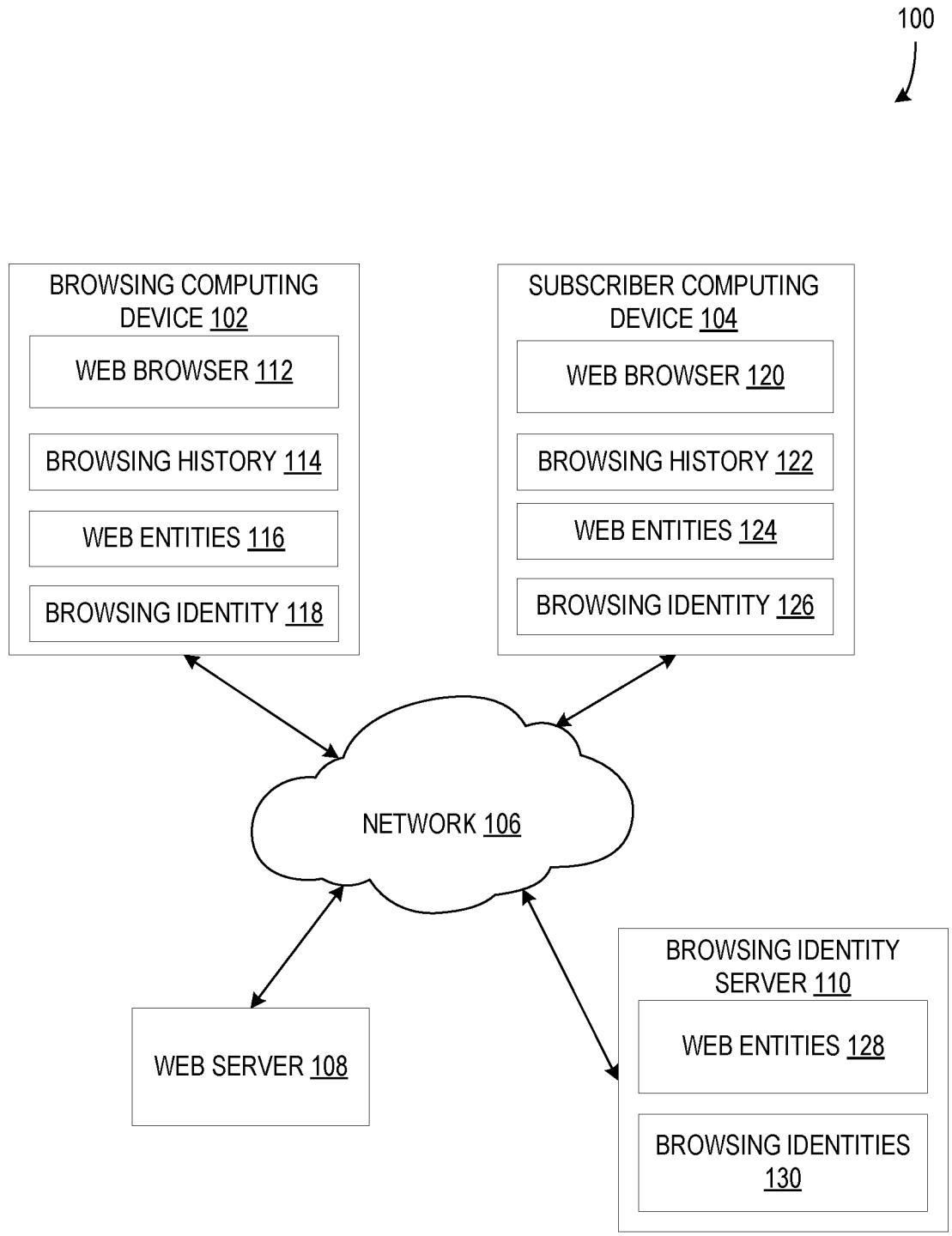
FIG. 1 is an exemplary block diagram illustrating a system including computing devices configured to share web entities over a network according to an embodiment.

The described system shares browsing activity of a user. Sharing may be customized based on trust relationships and sharing categories. Each user has an identity in a web browser for identification. Aspects of the disclosure enable collaboration among users by allowing users to subscribe to the browsing activity of friends, family or even celebrities via the identity. For example, in addition to allowing the users to view the browsing history of other users, web entity data is shared. Web entity data includes, for example, web site permissions and web site settings (e.g., web site configuration information and/or web site state information). Users elect to view and use the web entity data of the other users to which they are subscribed.

The computing devices described below are configured to enable web browser users to share the browsing activity between one another based on relationships formed between their browsing identities. Users may request to subscribe to another user's browsing identity and, when the request is granted or accepted, the subscribing user receives web entities associated with the browsing activity of the browsing identity to which the subscribing user has subscribed. A user associated with, corresponding to, or affiliated with a browsing identity chooses which web entities to share, when to share them, and with whom.

In an example, after establishing a trust relationship with one or more people (e.g., friends), as a user browses the web, web content from that browsing is automatically shared with the trusted people in real-time. Friends can then see all of the web sites visited by the user and/or web entities associated with the browsing. In return, as those friends browse, their history may be shared with the user.

In a specific example, as one user browses the web at work for vacations, vacation destinations of interest are automatically shared in real-time with a friend and visible in that friend's activity feed. This allows the friend to see the places the user might be interested in going. As the friend browses, the sites the friend visits are likewise shared in the activity feed. This provides a shared browsing history that can be persisted over-time, and searched later.

In this manner, the user experience of sharing browsing data with others is improved as the process is faster and easier. The disclosure also shares the browsing data automatically based on defined rules, and may share the browsing data via a browsing data feed. Additionally, the computing devices described herein provide enhanced security to the process of sharing browsing data through the use of the trust relationships.

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device', 'computing device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants, and many other devices.

FIG. 1 is an exemplary block diagram illustrating a system including computing devices configured to share web entities over a network according to an embodiment. The browsing computing device 102 comprises a web browser 112, browsing history 114, web entities 116, and a browsing identity 118 associated with use of the web browser 112. Similarly, the subscriber computing device 104 also comprises a web browser 120, browsing history 122, web entities 124, and browsing identity 126. Both computing devices 102 and 104 may comprise personal computers, laptops, mobile phones, tablets, or other devices.

The browsing computing device 102 and subscriber computing device 104 are connected to a network 106 (e.g., the Internet, a private intranet, etc.). Additionally, a web server 108 is connected to the network 106. It should be understood that, while one web server 108 is shown connected to the network 106, in alternative examples, more and/or different web servers may be connected to the network 106 and accessed by the computing devices 102 and/or 104. For instance, the network 106 may be the Internet or a sub-network of the Internet, such that many web servers are available for access by many users using computing devices. The web server 108 serves web pages and/or other web content over the network 106 to connected computing devices (e.g., browsing computing device 102, subscriber computing device 104, etc.), operating as a standard web server as is understood by a person of ordinary skill in the art.

Further, a browsing identity server 110 may also be connected to the network 106 in order to provide browsing identity services to the browsing computer 102, subscriber computing device 104, and other similar computing devices. For instance, the browsing identity server 110 may store browsing identities 130 of users as well as associated web entities 128. The web entities and browsing identities of the computing devices may be sent to the browsing identity server 110 for storage when they are collected and/or updated, on a defined upload schedule, or the like. In some examples, more than one browsing identity server may be connected to the network 106, such that the web entities 128 and browsing identities 130 stored on the browsing identity server may be stored redundantly on the multiple browsing identity servers. Through use of the browsing identity server, the web entities 128 and browsing identities 130 may be stored "in the cloud", enabling users to access the stored browsing identities 130 and web entities 128 on more than one browsing computing device without directly transferring the identities and data between the browsing computing devices. The cloud-stored web entities 128 may be accessed based on a user signing in to his/her associated browsing identity via a web browser.

Figure 2:
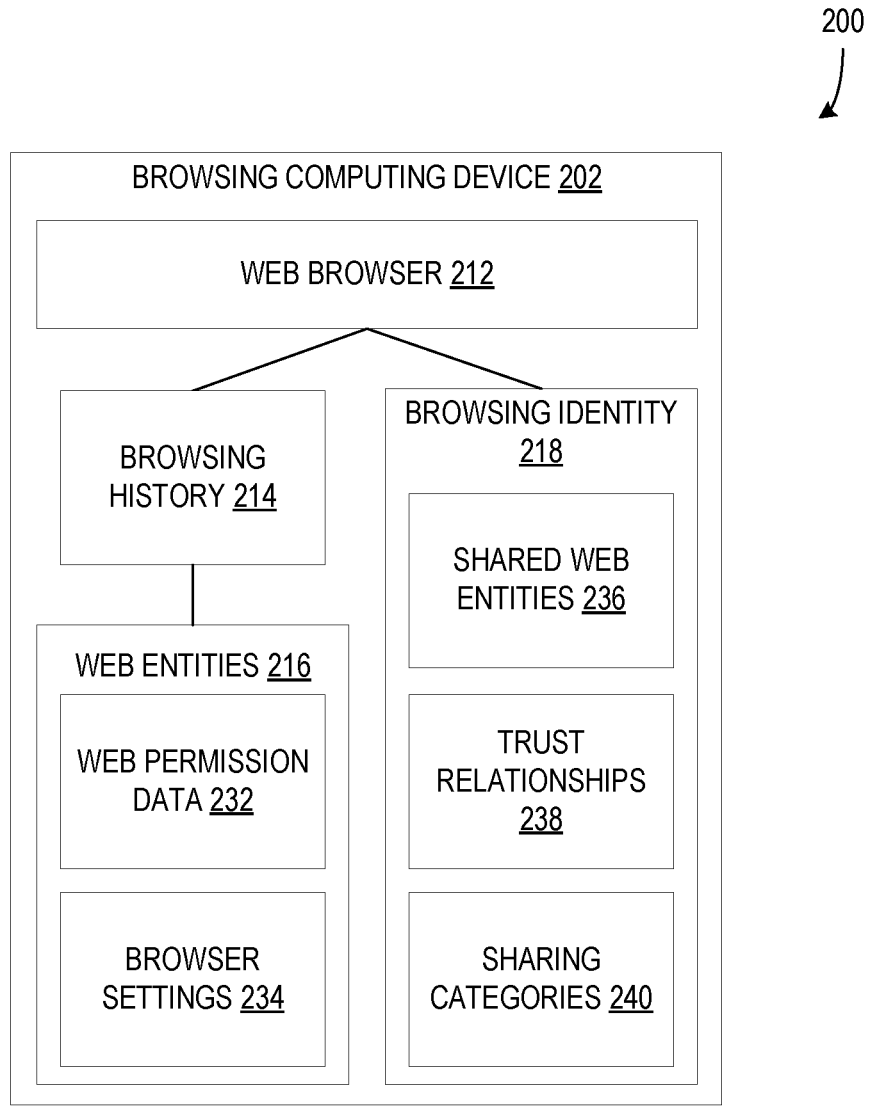
FIG. 2 is an exemplary block diagram illustrating a computing device configured to collect web entities from a web browser and share web entities via a browsing identity according to an embodiment.

FIG. 2 is an exemplary block diagram illustrating the computing device 202 configured to collect browsing history 214 and web entities 216 from a web browser 212 and share web entities 216 via a browsing identity 218 according to an embodiment.

The web browser 212 is a software application that provides user interfaces for displaying and interacting with web pages and the like on computing devices. Web browsers receive web page documents and/or other web entities/data and interpret the receive documents and/or data to display web pages to users. Further, web browsers enable users to interact with web pages, communicating the interactions back to web servers to navigate to different web pages, provide input to web pages, etc.

The browsing history 214 and web entities 216 include browsing data that is collected during use of the web browser. For instance, browsing history 214 may include web pages that have been visited in the past, date and time of visiting web pages, cached web pages and related media (e.g., pictures, video, audio, etc.), and the like.

Web entities 216, which do not include browsing history data (e.g., browsing history 214) as described herein, may include web permission data 232 such as user sign-on data, usernames and passwords for accessing specific web pages, permissions for use of a location, web capabilities such as full screen activation, notifications, pop-ups, or plug-ins, or peripherals such as cameras, microphones, etc., and state-saving data, such as "cookies"; browser settings 234 such as home web page settings, search history and settings, browser tab and/or window settings; and other browser data such as information entered in web forms, downloaded items, history of activity/interaction on a web page (e.g., copying text, saving pictures, downloading files, etc.), reading list items, web notes, and the like. Web entities 216 enable a web browser or similar application to display web content associated with the web entities 216 to other users, browsing identities, etc.

The browsing identity 218 is a data structure associated with a user and the web entities 216 collected while the user uses a web browser 212 to browse web pages and the like. A browsing identity 218 identifies the user and may include a username or similar identifier. Further, the browsing identity 218 may be associated with a password or other similar form of user authentication, enabling a user to prevent other users from making use of his/her browsing identity. The web entities 216 collected during browsing may be associated with the browsing identity 218 that is active while they are collected, such that a user using the browsing identity 218 may view, manage, edit, share, etc. the web entities 216. In some examples, web browsers are configured to enable a user to sign in to a browsing identity 218 prior to browsing with the application. For instance, a web browser 212 may present a user with a sign-on interface upon initiation of the web browser 212, such that, when the user signs on to his/her browsing identity 218, the web browser 212 may provide an interface enabling the user to begin browsing.

The browsing identity 218 is associated with shared web entities 236, which may have been shared with other browsing identities and/or other users according to the methods described herein. A shared web entity 236 may include the web entity itself, indications of other browsing identities with which the web entity has been shared, a timestamp of when the web entity was shared, a sharing category or categories 240 of the shared web entity 236, etc. Shared web entities 236 may be shared with other browsing identities one at a time (e.g., web page state saving data for a single web page, etc.) or in groups (e.g., a group of web page sign-on data for several different web pages, etc.). The shared web entities 236 and associated data may be stored in a repository or other data structure (e.g., on browsing identity server 110, etc.), enabling later access by the user of the browsing identity 218. The stored shared web entities 236 can be reviewed by the user, enabling the user to track what has been shared, when it was shared, and with whom.

Trust relationships 238 of the browsing identity 218 are formed with other browsing identities. A trust relationship 238 represents a sharing relationship between the browsing identity 218 and one or more other browsing identities. The user of the browsing identity 218 may create trust relationships 238 with other browsing identities by actively adding another browsing identity as a trusted sharing target or by reactively confirming requested sharing subscriptions from another browsing identity or the like. In some examples, trust relationships are created or inferred automatically and/or based on other signals, such as a parent's account that automatically creates a trust relationship with a child's account. A trust relationship 238 includes one or more trusted browsing identities with which web entities 214 may be shared. Further, a trust relationship may include or be associated with sharing categories 240. For instance, a browsing identity 218 may include a trust relationship 238 associated with subscriber browsing identities. In this case, the trusted browsing identities are those browsing identities which have been confirmed as subscribers to the browsing identity and the sharing category may simply be a "subscriber" category.

A sharing category 240 may be used with trust relationships 238 to share web entities 214 based on a particular topic, event, location, demographic, social group, workgroup, or the like. For instance, a sharing category may be directed to "music" or "sports" generally; a sporting event such as the Super Bowl; a city, town, or location of interest therein such as a museum, stadium or the like; or a social group, such as a group of work colleagues; etc. A user of a browsing identity 218 may create trust relationships 238 and/or associated sharing categories 240 in order to form focused groups of trusted browsing identities with which the browsing identity 218 may share a variety of categorized web entities 214.

Figure 3:
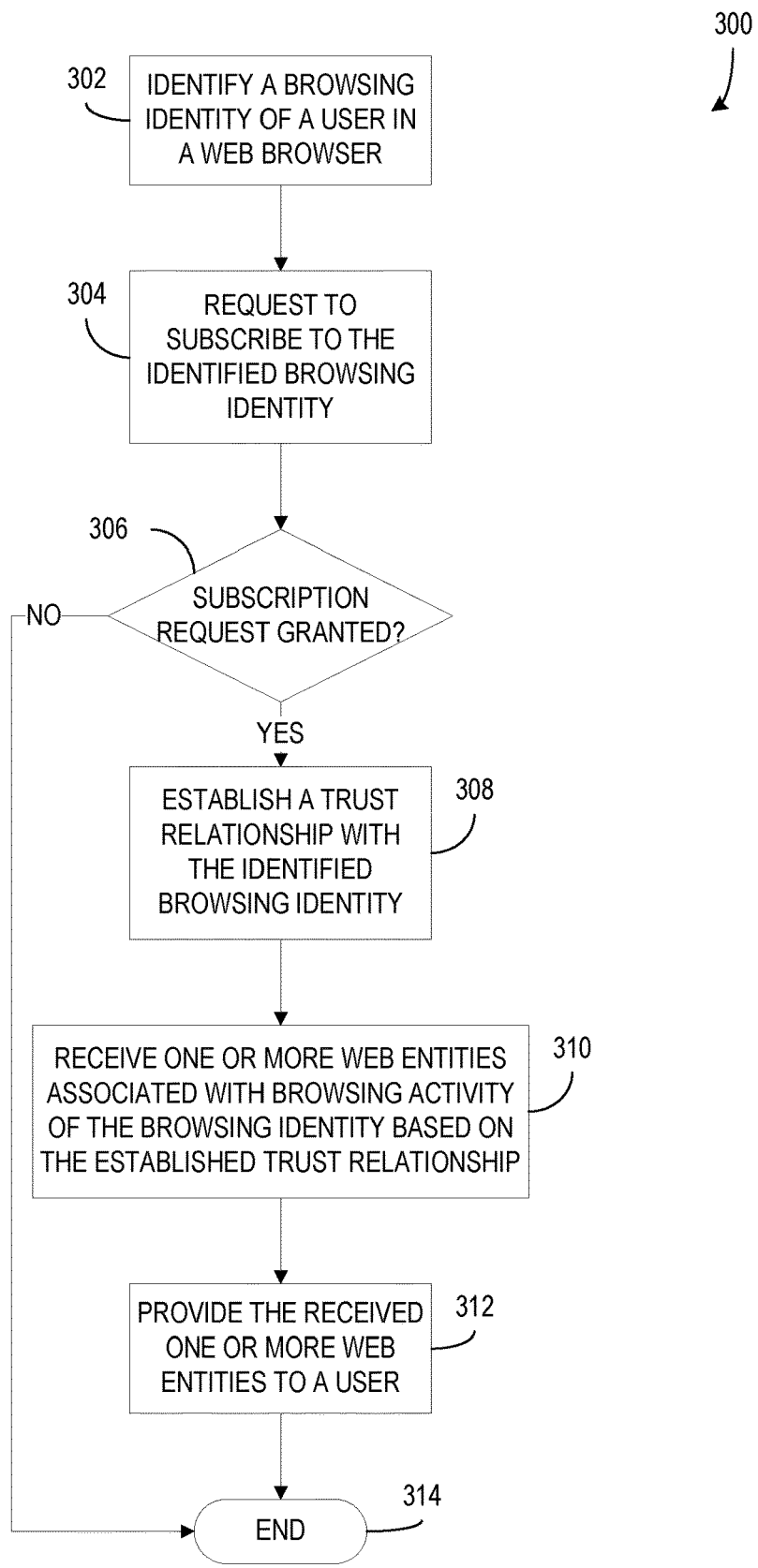
FIG. 3 is an exemplary flow chart illustrating operation of a computing device to request a subscription to a browsing identity and receive web entities associated with the browsing identity according to an embodiment.

FIG. 3 is an exemplary flow chart illustrating operation of a computing device to request a subscription to a browsing identity and receive web entities associated with the browsing identity according to an embodiment. At 302, a browsing identity of a user is identified in a web browser. In an example, the browsing identity may be identified as a result of an internet search for a particular topic, person, place, or the like, a link on a web page, a shared link sent from another user, etc. For instance, a user may identify a browsing identity of a famous person when searching the Internet for content pertaining to that person. Alternatively, a user may identify one or more browsing identities of musicians when searching for content pertaining to a particular genre of music. The browsing identities may be stored in an identity repository (e.g., in browsing identity server 110, etc.), such that the repository can be specifically searched by users. Browsing identities in the repository may be grouped by type, topic, demographics, related or similar browsing identities, etc. In an example, browsing identity metrics may be tracked in the identity repository and used for a variety of purposes, such as providing a "leaderboard" for most subscribers, most shares, most "likes" of shares, etc. This may enable users to quickly see which browsing identities are the most popular.

In another example, a user receives a link or other identifying information for a browsing identity from a friend or acquaintance via email, instant messaging, etc. or as an automatic recommendation. A recommendation of browsing identities may occur based on other browsing identities to which the user is already subscribed. For instance, if a user is subscribed to a baseball player on a baseball team, the user may receive recommendations to subscribe to other baseball players on the same or different baseball teams. In another example, a user receives recommendations of browsing identities based on the user's browsing history (e.g., if the user's browsing history indicates interest in a particular news story, he/she may receive recommendations to subscribe to browsing identities of reporters or news organizations covering that story and other related stories, etc.).

At 304, a request to subscribe to the identified browsing identity is sent. The request may be sent to the browsing identity, where it may be accessed and evaluated by the user associated with the browsing identity. In an example, the browsing identity may include a home web page or similar interface that is publicly accessible and, on that interface, a subscription link, button, or the like may be displayed, providing users with a way to easily request a subscription to the browsing identity. The home interface of the browsing identity may be specific to the browsing identity or the home interface may have been created separately (e.g., a typical web page, etc.) and the browsing identity subscription interface may be included therein.

The request to subscribe may be actively sent by a user or it may be automatically sent based on user-defined settings of a web browser and/or browsing identity. For instance, in an example, a user chooses to subscribe to a browsing identity when it is recommended. Alternatively, a user may choose a setting to always subscribe to recommended browsing identities and/or defined types of browsing identities (e.g., a user sets up a rule to automatically subscribe to all recommended browsing identities that are associated with a music genre, a specific event, a location, etc.).

At 306, the subscription request may be granted or denied. The subscription request may require an active confirmation from the user of the identified browsing identity. In an example, the user of the identified browsing identity receives a notification or other indication that a subscription has been requested and is presented with an interface with which to choose to confirm or deny the subscription. Alternatively, the decision of whether to grant the subscription request may be made automatically based on rules or settings created by the user of the identified browsing identity. For instance, the identified browsing identity may be configured to automatically grant all subscription requests (e.g., a browsing identity configured to share with the general public, etc.). In another example, the browsing identity may be configured to grant subscription requests from other users based on defined rules or filters, such as a filter that grants all subscription requests from browsing identities of users that live in a particular country or city, or a rule that grants subscription requests from browsing identities that are already subscribed to other trusted browsing identities.

If, at 306, the subscription request is granted, a trust relationship is established with the identified browsing identity at 308. The trust relationship that is established may be based on input from the subscriber as well as from the identified browsing identity. In some examples, the subscription request of 304 includes details pertaining to the trust relationship that the subscriber wishes to establish. In an example, the subscriber requests a subscription to shared web entities related to a particular upcoming concert event from a browsing identity associated with a local radio show host.

Further, the user of the identified browsing identity may also provide preferences regarding the trust relationship as it is established. The user of the identified browsing identity may view the subscriber's request and make selections to establish a trust relationship based on a variety of preferences. The user of the identified browsing identity may grant a subscription request, but limit the level or type of shared web entities that are shared with the subscriber based on sharing categories. In an example, the user of the identified browsing identity receives a subscription request from a subscriber that he/she does not know. The user establishes a trust relationship that limits the web entities shared to the subscriber to web entities that are shared publicly, rather than web entities that the user may share with only friends and family or with a workgroup. Alternatively, or additionally, the subscriber's request may include an indication that the subscriber is only interested in shared web entities pertaining to sports, so the user of the identified browsing identity may cause a trust relationship to be established that limits web entities being shared to the subscriber to web entities associated with sports sharing categories.

Alternatively, if, at 306, the subscription request is denied, the process ends at 314.

At 310, one or more web entities associated with browsing activity of the browsing identity are received. The web entities are received based on the established trust relationship and any associated sharing categories. For instance, in the example described above, if the trust relationship with the browsing identity is limited to shared web entities related to sports sharing categories, the received web entities include web entities shared by the browsing identity that relate to sports.

At 312, the received web entities are provided to a user. The web entities and/or web content based thereon may be displayed to the user via a web browser or other similar application or interface. For instance, a notification or indicator may appear on a screen indicating to the user that new shared web entities have been received. Interacting with the indicator may cause web content associated with the received web entities to be displayed. Alternatively, or additionally, the received web entities may be displayed in a new tab, window, or the like in the user's web browser. After 312, the process ends at 314.

In an example, the shared web entities may be used by a user in order to experience web browsing in the same or a similar way as the browsing identity to which the user subscribed. For instance, the user may receive the same recommended web pages or ads as the browsing identity. Further, a user may be able to access websites using the shared web permissions and/or profiles of the browsing identity, so that the user able to access precisely the same web browsing experience as the browsing identity to which he/she is subscribed. The shared web entities may also provide additional context to a simple web page, such as how the web page was reached, what web pages were accessed prior to the current web page, etc.

Figure 4:
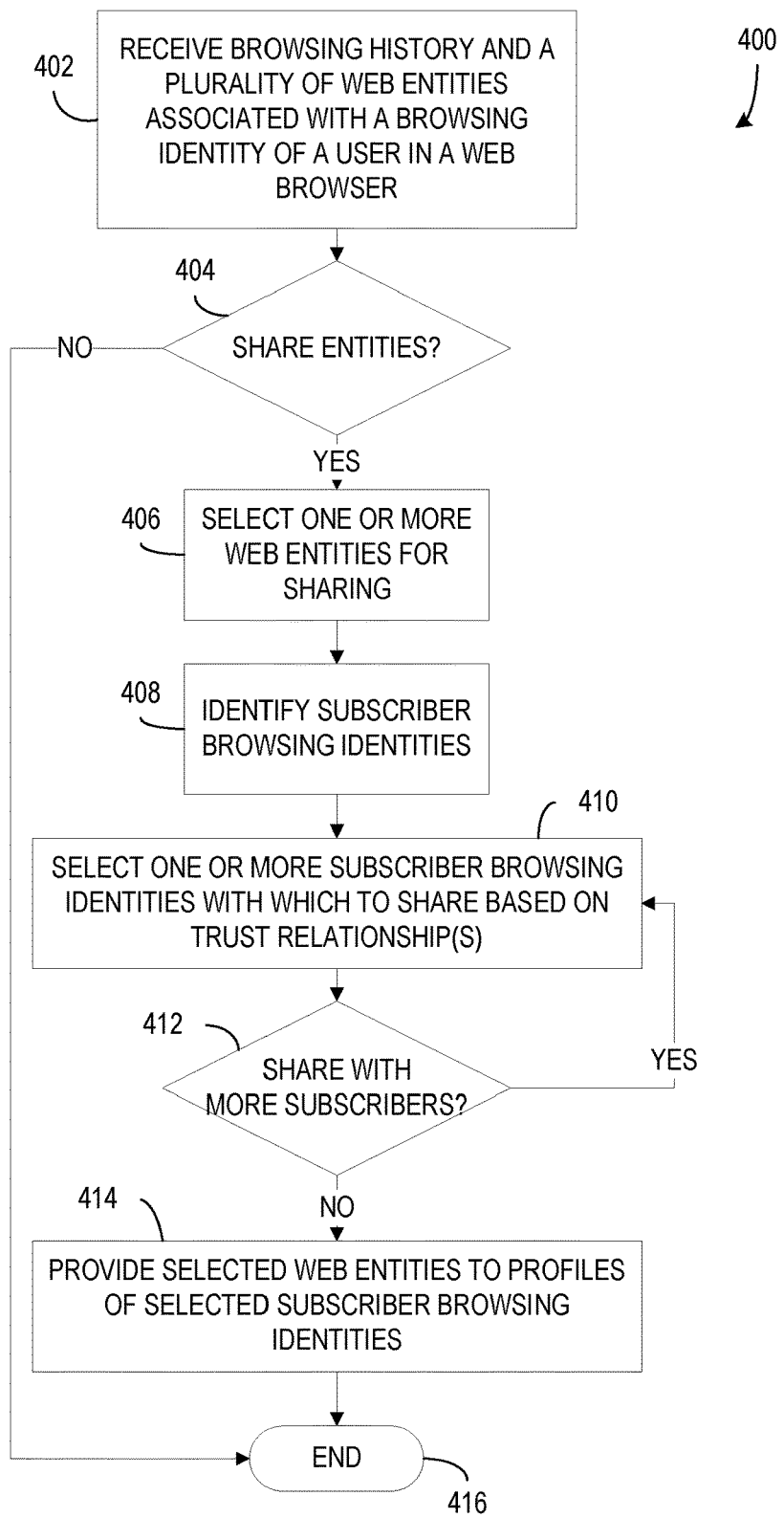
FIG. 4 is an exemplary flow chart illustrating operation of a computing device to share web entities with subscriber browsing identities according to an embodiment.

FIG. 4 is an exemplary flow chart illustrating operation of a computing device to share web entities with subscriber web identities according to an embodiment. At 402, browsing history and a plurality of web entities associated with a browsing identity of a user are received in a web browser. The reception of web entities is based on the operation of the web browser in the course of requesting and receiving web page content or the like, and may occur consistently throughout use of the web browser by the user associated with the browsing identity. However, the browsing history and many of the received web entities may not be shared via the browsing identity.

At 404, the user and/or the browsing identity is used to determine whether to share received web entities. In an example, only web entities, not including the browsing history, are chosen to be shared. Web entities that have recently been received, as well as web entities received in the past, may be considered for sharing. The decision of whether to share the web entities is primarily made by the user of the browsing entity (e.g., a user selects to share by interacting with a share button or menu interface, etc.). For instance, upon browsing to a particular web page, the user may decide that his/her friends would enjoy seeing the web page in its current state as well. Alternatively, or additionally, the decision of whether to share web entities may be made automatically based on sharing categories and rules established by the user for the browsing identity. For instance, the user of the browsing identity may create a rule that causes browsing context web entities of articles from selected news web sites to be automatically shared with subscribers as they are received during browsing.

If it is decided that web entities should be shared, one or more of the web entities are selected for sharing at 406. As mentioned above, the selection of web entities to be shared may be based on a user of the browsing identity actively selecting web entities for sharing and/or automatic selection by the web browser based on establishes rules. Selecting web entities to be shared may include the user navigating a sharing interface as part of a web browser. The sharing interface may include a list, menu, or other group of web entities available for sharing. Alternatively, or additionally, web entities may be selected for sharing by interacting with a sharing interface associated with each web entity (e.g., dragging a browser tab into a sharing region to share the context data of the web page in the browser tab, clicking on a share button of a favorited web page to share permissions data for the web page, activating a sharing browser tab and browsing in the tab to share the associated web entities, etc.). The selected web entities may be shared immediately or stored for later sharing. If it is decided to not share the entities at 404, the process ends at 416.

At 408, subscriber browsing identities are identified to enable some or all of them to be selected as targets for sharing. The available subscriber browsing identities may be displayed to the user in an interface of the web browser. The subscribers may be identified individually or as groups and they may be arranged or sorted based on one or more sorting rules (e.g., alphabetical order, recent sharing, most common sharing, most relevant to selected web entities for sharing, etc.). For instance, upon selecting the web entities to be shared, an interface may be displayed that includes the mostly likely subscriber browsing identities or groups to be shared with based on sharing categories and/or trust relationships associated therewith. In an alternative example, the interface displays the available subscriber browsing identities and/or groups that are the most common targets of sharing in order to enable the user to quickly share web entities.

At 410, one or more of the identified subscriber browsing identities are selected for sharing based on the associated trust relationship(s). The user of the browsing identity may select subscriber browsing identities one at a time based on individual trust relationships or he/she may select groups of subscriber browsing identities based on the subscriber browsing identities being associated with similar trust relationships/sharing categories. For instance, if the web entities to be shared are related to baseball, subscriber browsing identities that are associated with trust relationships that include or are associated with a 'baseball' sharing category may be selected. In another example, subscriber browsing identities that are associated with "friend" or "family" level trust relationships are selected when the user of the browsing identity prefers to limit sharing of the selected web entities to only his/her friends and family rather than the general public.

Once subscriber browsing identities have been selected based on associated trust relationships, it is determined whether other subscribers should also be selected at 412. Web entities to be shared may not be associated with only one type or level of sharing category/trust relationship. For instance, if the web entities to be shared relate to a local sporting event, such as a baseball game, the user may want to share with subscribers associated with 'baseball' trust relationships and sharing categories as well as subscribers associated with 'local' trust relationships and sharing categories. As a result, it may be necessary or desirable for the user to select several groups of subscriber browsing identities to share the web entities across all of the desired subscribers. If more subscriber browsing identities are to be selected, the process returns to 410. If not, the process proceeds to 414.

At 414, the selected web entities for sharing are provided to accounts/profiles associated with the selected subscriber browsing identities. The shared web entities and subscriber browsing identities with which they are shared may be stored with the sharing browsing identity as shared web entity data. The provided web entities may be actively "pushed" to the profiles of selected subscriber browsing identities, causing the provided web entities to be sent directly to the selected browsing identities, or the provided web entities may be posted and/or stored to a web entity feed from which the shared web entities may be "pulled" by the selected subscriber browsing identities. The provided web entities may cause a notification to be provided to the selected subscriber browsing identities, enabling the subscribers to become aware of the newly shared web entities and providing access to the shared web entities. In an example, the provided web entities are broadcast to the selected subscribers such that the selected subscribers may observe the browsing activity of the sharing browsing identity in real-time. Once the web entities are shared, the process ends at 416.

Figure 5A:
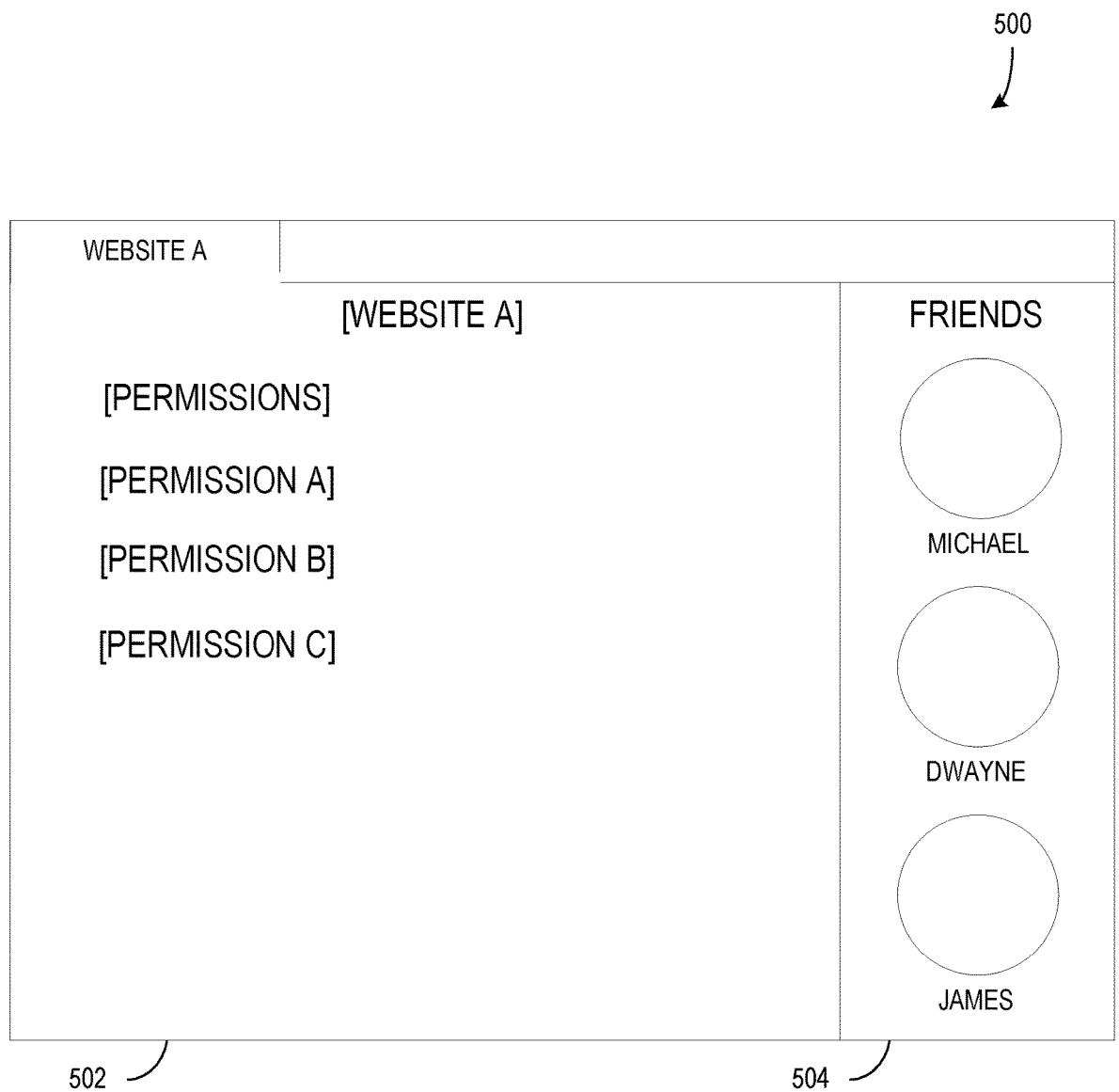
FIGS. 5A-5C are exemplary interfaces illustrating the sharing of web entities between browsing identities according to an embodiment.
Figure 5B:
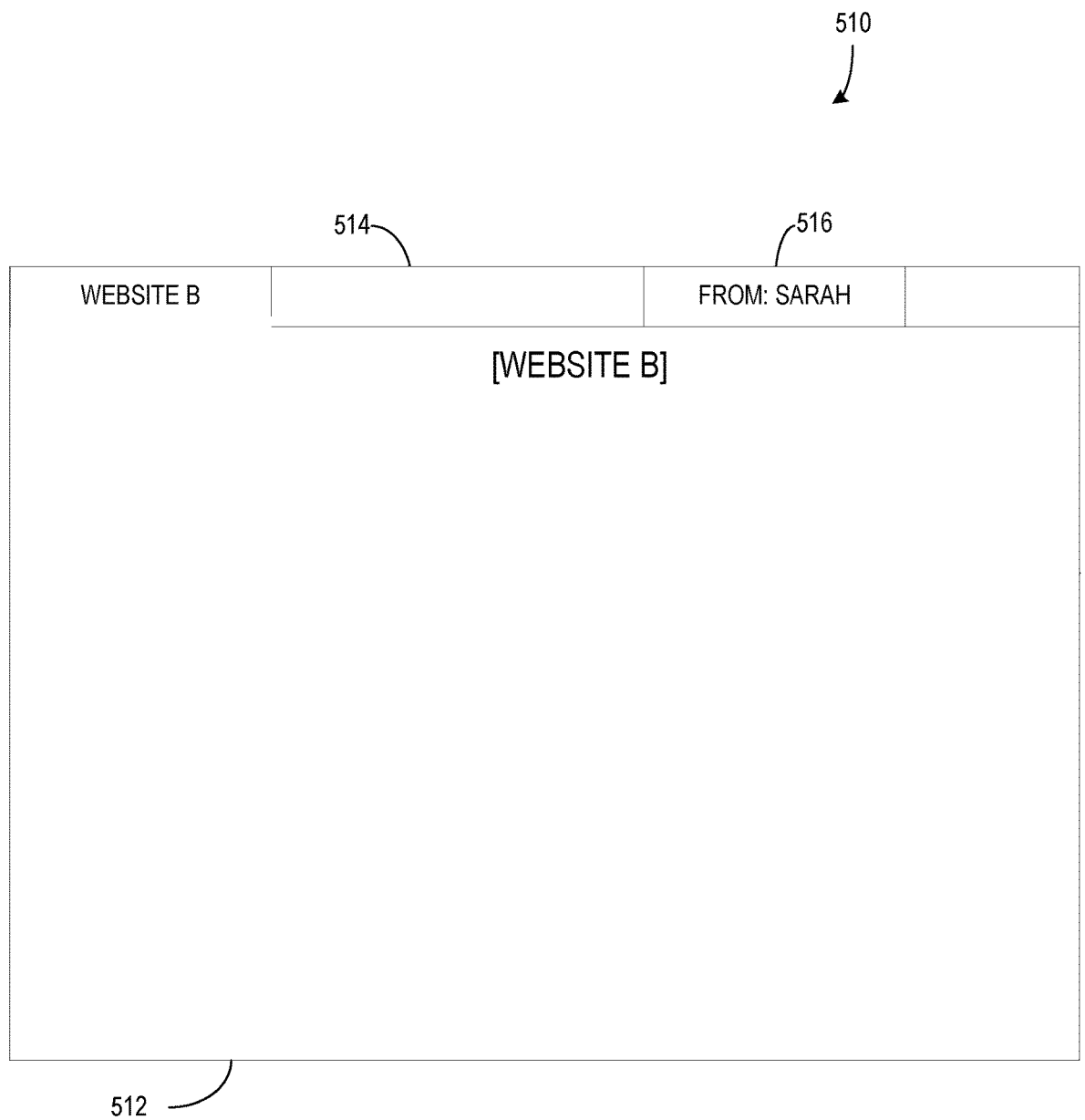
Figure 5C:
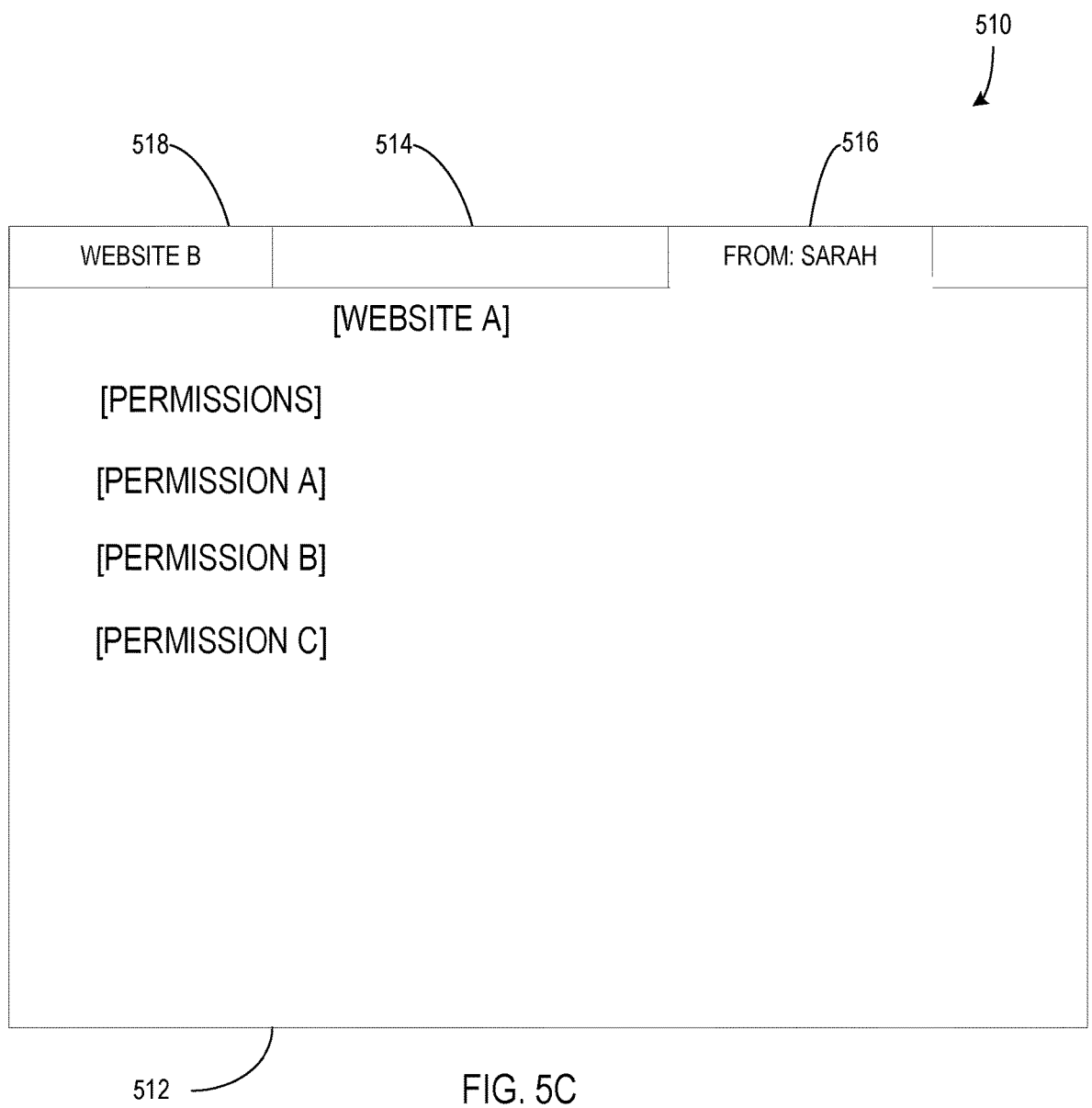

FIGS. 5A-5C are exemplary interfaces illustrating the sharing of web entities between browsing identities according to an embodiment. FIG. 5A shows a web browser interface 500 including a web page panel 502 and a subscriber panel 504. A user, Sarah, is browsing a web page of website A in the web browser interface 500. The web page, shown in the web page panel 502, includes web content that is dependent on permissions associated with Sarah's browsing identity (e.g., permissions A, B, and C, etc.) and Sarah wants to share the web content with a friend. In order to share the web page, Sarah has opened the subscriber panel 504, where several different subscriber browsing identities (Michael, Dwayne, and James) are displayed. Sarah wants to share the current web page, including the permissions-dependent web content, with her friend, Michael, so she drags the web page to Michael's browsing identity icon in the subscriber panel 504.

In FIG. 5B, Michael's web browser interface 510 is shown. The web browser interface 510 includes a web page panel 512 and a tab bar 514. Michael is browsing a web page of a website B in the web page panel 512 when a notification tab 516 appears in the tab bar 514. The notification indicates that something has been shared with Michael by his friend, Sarah. The notification is displayed as a tab in the tab bar 514 and may be highlighted by color, by changing colors, by a sound being played, or the like. The shared web entity does not immediately appear in the main web page panel 512 so as to avoid interrupting Michael's current browsing. Michael can click on or otherwise interact with the notification tab 516 when he wishes to see what Sarah has shared with him.

In FIG. 5C, Michael has clicked on the notification tab 516 to activate Sarah's shared web page. The shared web page fills the web page panel 512 so that Michael can view it in the same state that Sarah shared it (e.g., the web page is displayed as if Michael were using permissions associated with Sarah's browsing identity because web entities were shared from Sarah to Michael). Michael's previous web page is maintained on a tab 518 of the tab bar 514 so that Michael can return to his previous browsing activity after viewing Sarah's shared web page.

In another example, a user is browsing a web page of a shopping website in a web browser interface. The user has selected some items for purchase from the shopping website and wants to share those choices with a friend before finalizing the purchase. In order to share the web page, the user has opened the subscriber panel, where several different subscriber browsing identities are displayed. The user wants to share the current shopping cart web page with a friend so the user drags the web page to the friend's browsing identity icon in the subscriber panel.

The user's friend is browsing a web page when a notification tab appears. The notification indicates that something has been shared with the friend by the user. The friend interacts with the notification to activate the shared web page. The shared shopping cart web page fills the web page panel so that the friend can view it in the same state that the user shared it.

Additional Example Scenarios

Aspects of the disclosure enables various scenarios, such as next described.

Users of a web browser are enabled to search for, find, and subscribe to other users via their browsing identities. Finding browsing identities may include searching for names of users and/or other aspects or demographics related to users, such as location, group membership, interest categories, etc.

A web browser includes an interface that display all of the other browsing identities to which a user is subscribed and/or all of the other browsing identities that have subscribed to the user's browsing identity.

While browsing, a user selects a subscriber browsing identity and chooses to share a set of browser tabs with the selected subscriber browsing identity. This may include selecting the browser tabs to share and dragging and dropping them into a sharing region of a web browser interface. The tabs are then accessible by the subscriber browsing identity, enabling the user of the subscriber browsing identity to open and view the set of browser tabs in the same state as when they were shared.

A user selects a list of subscriber browsing identities and chooses to share web entities with all of the subscriber browsing identities on the selected list, while browsing.

A user selects one or more subscriber browsing identities while browsing and chooses to broadcast current browsing activity to the selected subscriber browsing identities. As the user browses, some or all of the web entities resulting from the browsing activity are shared with the selected subscriber browsing identities, enabling the subscribers to observe the user's browsing activity in real-time.

While browsing, a user selects a subscriber browsing identity and chooses to invite the subscriber browsing identity to share browsing activity/history, enabling the user and the subscriber to share browsing activity back and forth during a collaborative browsing session. This may enable groups of co-workers working on a project to share a browsing session related to project research, or it may enable a group of family members to share a browsing session for making vacation plans, etc.

A user who is subscribed to a browsing identity receives a notification while browsing indicating that the browsing identity has chosen to share browsing activity/web entities with the user. The user may click on or otherwise interact with the notification to access the shared browsing activity/web entities. For instance, a new tab or window may be opened in the web browser and the shared web entities displayed therein.

While browsing, a user who is subscribed to a browsing identity and has received web entities from the browsing identity receives the same auto-complete recommendations and/or suggestions as the user of the browsing identity when typing into a search bar or the like.

After having received web entities from a browsing identity, a user views a stateful web page in the same state as would be viewed by a user of the browsing identity.

Exemplary Operating Environment

Figure 6:
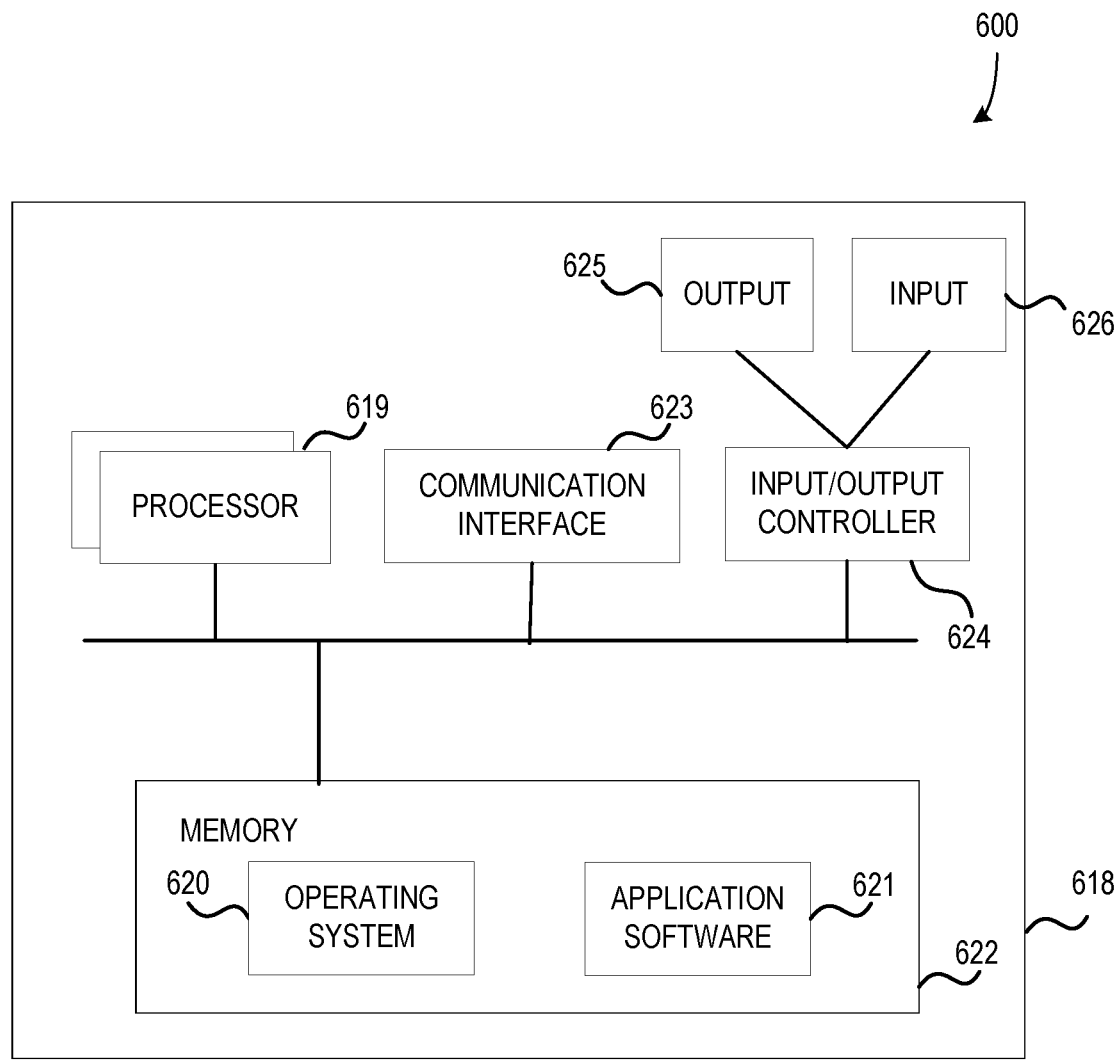
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the apparatus 618 to enable application software 621 to be executed on the device. According to an embodiment, the establishment of trust relationships between browsing identities and sharing of web entities between the browsing identities based on the trust relationships may be accomplished by software.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user 627 may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

At least a portion of the functionality of the various elements in FIGS. 1, 2, and 6 may be performed by other elements in FIG. 1, 2, or 6, or an entity (e.g., processor, web service, server, application program, computing device, etc.) not shown in FIG. 1, 2, or 6.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for sharing browsing web entities comprising: at least one processor; and at least one memory comprising computer program code, the at least one memory and the computer program code configured to, with the at least one processor, cause the at least one processor to:

receive browsing history and a plurality of web entities associated with a first browsing identity of a first user in a web browser, the browsing history and the plurality of web entities associated with browsing activity;

select one or more web entities of the plurality of web entities for sharing;

select one or more subscriber browsing identities associated with the first browsing identity based on one or more associated trust relationships; and provide the selected one or more web entities to profiles associated with the selected one or more subscriber browsing identities.

The system described above, wherein the received browsing history is not selected for sharing.

The system described above, wherein the at least one memory and the computer program code are configured to, with the at least one processor, further cause the at least one processor to:

receive a request to subscribe a second browsing identity to the first browsing identity; and establish a trust relationship between the first browsing identity and the second browsing identity when the request to subscribe is granted.

The system described above, wherein the one or more selected web entities are associated with one or more sharing categories; and selecting the one or more subscriber browsing identities associated with the first browsing identity based on the one or more associated trust relationships includes selecting one or more subscriber browsing identities associated with trust relationships that include the one or more sharing categories.

The system described above, wherein the one or more sharing categories include one or more of location-based sharing categories, demographic-based sharing categories, topic-based sharing categories, or event-based sharing categories.

The system described above, wherein the one or more associated trust relationships include one or more of a public-level trust relationship, a friend-level trust relationship, or a workgroup-level trust relationship.

The system described above, wherein the selected one or more web entities include one or more of web permissions, browser settings, or state-saving data.

The system described above, wherein sharing the selected one or more web entities to the selected one or more subscriber browsing identities includes posting the selected one or more web entities to a web entity feed that is accessible to the selected one or more subscriber browsing identities.

A computerized method for recovering network connectivity comprising: receiving browsing history and a plurality of web entities associated with a first browsing identity of a first user in a web browser, the browsing history and plurality of web entities associated with browsing activity;

selecting, by a processor, one or more web entities of the plurality of web entities for sharing;

selecting, by the processor, one or more subscriber browsing identities associated with the first browsing identity based on one or more associated trust relationships; and sending the selected one or more web entities to the selected one or more subscriber browsing identities.

The computerized method described above, wherein the received browsing history is not selected for sharing.

The computerized method described above, further comprising:

receiving a request to subscribe a second browsing identity to the first browsing identity; and establishing a trust relationship between the first browsing identity and the second browsing identity when the request to subscribe is granted.

The computerized method described above, wherein the one or more selected web entities are associated with one or more sharing categories; and selecting the one or more subscriber browsing identities associated with the first browsing identity based on the one or more associated trust relationships includes selecting one or more subscriber browsing identities associated with trust relationships that include the one or more sharing categories.

The computerized method described above, wherein the one or more sharing categories include one or more of location-based sharing categories, demographic-based sharing categories, topic-based sharing categories, or event-based sharing categories.

The computerized method described above, wherein the one or more associated trust relationships include one or more of a public-level trust relationship, a friend-level trust relationship, or a workgroup-level trust relationship.

The computerized method described above, wherein the selected one or more web entities include one or more of web permissions, browser settings, or state-saving data.

One or more computer storage media having computer-executable instructions for recovering network connectivity that, upon execution by a processor, cause the processor to at least:

identify, by a first browsing identity of a first user, a second browsing identity of a second user in a web browser;

request to subscribe the first browsing identity to the second browsing identity;

establish a trust relationship between the first browsing identity and the second browsing identity when the request to subscribe is granted;

receive, by the first browsing identity, based on the established trust relationship, one or more web entities associated with browsing activity of the second browsing identity; and provide the received one or more web entities to the first user.

The one or more computer storage media described above, wherein the second browsing identity is identified based on a search for the second browsing identity.

The one or more computer storage media described above, wherein the second browsing identity is identified via a recommendation of the second browsing identity based on one or more of current browsing identity subscriptions of the first browsing identity, shared interests of the first browsing identity, and shared location of the first browsing identity.

The one or more computer storage media described above, wherein establishing the trust relationship between the first browsing identity and the second browsing identity includes associating one or more sharing categories with the trust relationship; and wherein the one or more web entities are received based on the one or more sharing categories.

The one or more computer storage media described above, wherein providing the received one or more web entities to the first user includes notifying the first user of the received one or more web entities via a notification interface in a web browser and, in response to interaction with the notification interface, displaying web content based on the received one or more web entities in the web browser.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for establishing trust relationships between browsing identities and sharing web entities between the browsing identities based on the established trust relationships. The illustrated one or more processors 619 together with the computer program code stored in memory 622 constitute exemplary processing means for sharing web entities based on browsing activity of a browsing identity to other subscriber browsing identities based on trust relationships established between the browsing entities.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for sharing browsing web entities, the system comprising:
    at least one processor; and
    at least one memory comprising computer program code, the at least one memory and the computer program code configured to, with the at least one processor, cause the at least one processor to:
        receive a browsing history and a plurality of web entities associated with a first browsing identity of a user in a web browser, the browsing history and the plurality of web entities associated with a current browsing activity of the user;
        identify one or more subscriber browsing identities of other users associated with the first browsing identity based on one or more trust relationships;
        identify one or more web entities of the plurality of web entities for sharing with a portion of the identified one or more subscriber browsing identities based on a topic-based sharing category defined by the identified one or more subscriber browsing identities, the topic-based sharing category identifying a topic that the portion of the identified one or more subscriber browsing identities are authorized to view during a first session of the user in the web browser, wherein the user is also authorized to view the topic during a second session of the one or more subscriber browsing identities in a corresponding web browser; and
        cause the identified one or more web identities to be shared with the portion of the identified one or more subscriber browsing identities without sharing the identified one or more web entities with other of the identified one or more subscriber browsing identities.

2. The system of claim 1, wherein the computer program code further causes the at least one processor to automatically send the identified one or more web entities with the portion of the identified one or more subscriber browsing identities upon identifying the topic during the first session of the user.

3. The system of claim 1, wherein the at least one memory and the computer program code are configured to, with the at least one processor, further cause the at least one processor to:
receive a request to subscribe a second browsing identity to the first browsing identity;
establish a trust relationship between the first browsing identity and the second browsing identity upon the request being granted; and
after establishing the trust relationship with the second browsing identity, one or more second web entities are automatically shared with the second browsing identify in real-time based on a topic-based sharing category defined by the second browsing identity with the first browsing identity.

4. The system of claim 1, wherein the identified one or more web entities are associated with one or more sharing categories, and wherein selecting the one or more subscriber browsing identities includes selecting one or more subscriber browsing identities based on the trust relationships associated with the one or more sharing categories.

5. The system of claim 4, wherein the one or more sharing categories include one or more of: location-based sharing categories, demographic-based sharing categories, topic-based sharing categories, and event-based sharing categories.

6. The system of claim 1, wherein the at least one memory and the computer program code are configured to, with the at least one processor, further cause the at least one processor to:
receive, from the one or more subscriber browsing identities, the topic-based sharing category defined by the identified one or more subscriber browsing identities.

7. The system of claim 1, wherein the computer program code further causes the at least one processor to receive, from the user, authorization to send the identified one or more web entities with the portion of the identified one or more subscriber browsing identities upon identifying the topic during the first session of the user.

8. The system of claim 1, wherein the second session is a different session than the first session.

9. A computerized method comprising:
accessing a browsing history and a plurality of web entities associated with a first browsing identity of a user in a web browser, the browsing history and plurality of web entities associated with a current browsing activity of the user;
identifying, by a processor, one or more subscriber browsing identities of other users associated with the first browsing identity based on one or more associated trust relationships, the identified one or more subscriber browsing identities corresponding to other users;
receiving, from one or more subscriber browsing identities, a topic-based sharing category defined by the identified one or more subscriber browsing identities;
identifying one or more web entities of the plurality of web entities for sharing with a portion of the identified one or more subscriber browsing identities based on the topic-based sharing category defined by the identified one or more subscriber browsing identities, the topic-based sharing category identifying a topic that the portion of the one or more subscriber browsing identities are authorized to view during a first session of the user in a web browser, wherein the user is further authorized to view the topic during a second session of the one or more subscriber browsing identities in a corresponding web browser; and
cause the identified one or more web identities to be shared with the portion of the identified one or more subscriber browsing identities without sharing the identified one or more web entities with other of the identified one or more subscriber browsing identities.

10. The computerized method of claim 9, further comprising:
receiving a request to subscribe the identified one or more subscriber browsing identities to the first browsing identity;
establish a trust relationship between the first browsing identity and the identified one or more subscriber browsing identities upon the request being granted; and
automatically share the identified one or more web entities with the identified one or more subscriber browser identities in real time based at least on the established trust relationship.

11. The computerized method of claim 9, further comprising:
receiving a request to subscribe a second browsing identity to the first browsing identity;
prompting the user to accept the received request; and
establishing a trust relationship between the first browsing identity and the second browsing identity upon acceptance of the received request.

12. The computerized method of claim 9, further comprising categorizing the identified one or more web entities into one or more sharing categories, and wherein selecting the one or more subscriber browsing identities comprises selecting one or more subscriber browsing identities based on the one or more sharing categories.

13. The computerized method of claim 12, wherein the one or more sharing categories include three or more of: location-based sharing categories, demographic-based sharing categories, topic-based sharing categories, and event-based sharing categories.

14. The computerized method of claim 9, wherein the user is authorized to view the topic during a second session of the one or more subscriber browsing identities in a corresponding web browser based at least on the portion of the identified one or more subscriber browsing identities are authorized to view the topic during the first session of the user in the web browser.

15. The computerized method of claim 9, wherein the identified one or more web entities include one or more of: web permissions, browser settings, and state-saving data.

16. One or more computer storage media having computer-executable instructions that, upon execution by a processor, cause the processor to at least:
identify, based on a first browsing identity of a first user, a second browsing identity of a second user;
request to subscribe the first browsing identity to the second browsing identity;
establish a trust relationship between the first browsing identity and the second browsing identity upon granting the request;
receive, by the first browsing identity based on the established trust relationship, one or more web entities associated with a current browsing activity of the second browsing identity;

identify one or more subscriber browsing identities of other users associated with the first browsing identity based on one or more associated trust relationships, the identified one or more subscriber browsing identities corresponding to other users;

identify a web entity from the one or more web entities for sharing with a portion of the identified one or more subscriber browsing identities based on a topic-based sharing category defined by the identified one or more subscriber browsing identities, the topic-based sharing category identifying a topic that the portion of the one or more subscriber browsing identities are authorized by the first user to view during a first session of the first user in a web browser, wherein the first user is further authorized to view the topic during a second session of the one or more subscriber browsing identities in a corresponding web browser; and cause the identified one or more web identities to be shared with the portion of the identified one or more subscriber browsing identities without sharing the identified one or more web entities with other of the identified one or more subscriber browsing identities.

17. The one or more computer storage media of claim 16, wherein the second browsing identity is identified based on a search.

18. The one or more computer storage media of claim 16, wherein the second browsing identity is identified based on one or more of: current browsing identity subscriptions of the first browsing identity, interests of the first browsing identity, and a location of the first browsing identity.

19. The one or more computer storage media of claim 16, wherein establishing the trust relationship includes associating one or more sharing categories with the trust relationship, and wherein the one or more web entities are received based on the one or more sharing categories.

20. The one or more computer storage media of claim 16, wherein providing the received one or more web entities to the first user includes notifying the first user of the received one or more web entities via a notification interface in a web browser and, in response to user interaction with the notification interface, displaying web content based on the received one or more web entities in the web browser.

\* \* \* \* \*